(12) United States Patent
Iskrev et al.

(10) Patent No.: US 10,988,247 B2
(45) Date of Patent: Apr. 27, 2021

(54) UNMANNED AERIAL VEHICLE AND PROPULSION SYSTEM FOR AN UNMANNED AERIAL VEHICLE

(71) Applicant: UVIONIX AEROSPACE CORPORATION, Rancho Cordova, CA (US)

(72) Inventors: Yordan Iskrev, Rancho Cordova, CA (US); Boris Iskrev, Rancho Cordova, CA (US)

(73) Assignee: UVIONIX AEROSPACE CORPORATION, Rancho Cordova, CA (US)

( * ) Notice: Subject to any disclaimer, the term of this patent is extended or adjusted under 35 U.S.C. 154(b) by 301 days.

(21) Appl. No.: 16/163,921

(22) Filed: Oct. 18, 2018

(65) Prior Publication Data

US 2019/0118941 A1    Apr. 25, 2019

Related U.S. Application Data

(60) Provisional application No. 62/574,371, filed on Oct. 19, 2017.

(51) Int. Cl.
*B64C 27/58*   (2006.01)
*B64C 11/30*   (2006.01)
(Continued)

(52) U.S. Cl.
CPC ............ *B64C 27/58* (2013.01); *B64C 11/306* (2013.01); *B64C 11/32* (2013.01); *B64C 11/44* (2013.01);
(Continued)

(58) Field of Classification Search
CPC ......... B64C 11/32; B64C 27/12; B64C 27/14; B64C 27/58; B64C 11/44; B64C 11/306; B64C 27/10; B64C 39/024; B64C 2201/044; B64C 2201/024; B64C 2201/042; B64D 27/24; Y02T 50/60
See application file for complete search history.

(56) References Cited

U.S. PATENT DOCUMENTS

| 5,879,131 A  * | 3/1999 | Arlton ..................... B64C 27/10 |
| | | 416/132 A |
| 9,493,235 B2 | 11/2016 | Zhou et al. |
| 2016/0167778 A1 | 6/2016 | Meringer et al. |

FOREIGN PATENT DOCUMENTS

| CN | 106275425 A | 1/2017 | |
| EP | 2028099 A1 * | 2/2009 | ............ B64C 11/44 |
| EP | 2028099 A1 | 2/2009 | |

OTHER PUBLICATIONS

International Search Report dated Jan. 15, 2019 for corresponding PCT Application PCT/US2018/056661.

* cited by examiner

*Primary Examiner* — Assres H Woldemaryam
(74) *Attorney, Agent, or Firm* — Grogan, Tuccillo & Vanderleeden, LLP (57) ABSTRACT

An unmanned aerial vehicle includes a propulsion system having at least one propulsion module comprised of at least one propeller and at least two motors/engines, one or more of the motors/engines providing mechanical energy to drive the propeller, wherein the difference between the angular velocities of the motors/engines provides energy input to a mechanical or magneto-mechanical linkage system to change the blade pitch angle of the propeller, in cyclic and/or collective manner.

16 Claims, 5 Drawing Sheets

(51) Int. Cl.
*B64C 27/10* (2006.01)
*B64C 39/02* (2006.01)
*B64C 27/12* (2006.01)
*B64D 27/24* (2006.01)
*B64C 11/44* (2006.01)
*B64C 27/14* (2006.01)
*B64C 11/32* (2006.01)

(52) U.S. Cl.
CPC .............. *B64C 27/10* (2013.01); *B64C 27/12* (2013.01); *B64C 27/14* (2013.01); *B64C 39/024* (2013.01); *B64D 27/24* (2013.01); *B64C 2201/024* (2013.01); *B64C 2201/042* (2013.01); *B64C 2201/044* (2013.01)

UNMANNED AERIAL VEHICLE AND PROPULSION SYSTEM FOR AN UNMANNED AERIAL VEHICLE

CROSS-REFERENCE TO RELATED APPLICATIONS

This application claims the benefit of U.S. Provisional Application Ser. No. 62/574,371, filed on Oct. 19, 2017, which is hereby incorporated by reference herein in its entirety.

FIELD OF THE INVENTION

The present invention relates generally to aerial vehicles and, more particularly, to an unmanned aerial vehicle and propulsion system therefor.

BACKGROUND OF THE INVENTION

An unmanned aerial vehicle (UAV), commonly known as a drone, is an aircraft without a human pilot aboard. Its flight is controlled either autonomously by onboard computers or by the remote control of a pilot on the ground or in another vehicle. UAVs are commonly used in military and special operations applications, and are increasingly finding uses in civil, commercial and recreational applications, such as policing and surveillance, aerial filming, and the delivering of packages to end consumers.

Existing UAVs may be of the single rotor or dual coaxial rotor type, which provide a number of distinctive advantages over other UAV designs. For example these types of UAVs typically have a compact footprint, a small rotor disc surface area, and a small circumference, which makes them particularly suitable for a number of applications where close interaction with people and reliable operation even with environment disturbances is essential.

In a propeller-based propulsion system, such as that often employed with UAVs, thrust is produced along the axis of rotation (referred to herein as the "z-axis") of the propeller and can be controlled by changing the rotational velocity of the propeller and/or the blade pitch. In case the blade pitch of the propeller remains predominantly unchanged throughout a particular propeller revolution, the resultant (average) produced thrust (lift) force will be acting purely along the z-axis. The propeller rotation will thereby produce no torque with respect to suspension points lying on z-axis, except in the plane of rotation of the propeller.

By varying the blade pitch of all blades of a propeller simultaneously, it is possible to change the magnitude of the thrust force produced. In helicopters, this type of control is referred to as collective pitch control. By extension, the term "collective pitch control" is used herein to refer to changing the blade pitch of all blades of a propeller simultaneously, unrelated to whether or not this is a part of the propulsion system of a helicopter.

By cyclically varying the blade pitch of every blade of a propeller, in a way that the pitch of a blade has a certain value depending on the position of the blade in the particular revolution, one can offset the axis around which the average thrust force is generated to no longer coincide with the z-axis. As a result, the propeller will generate net torque with respect to suspension points lying on the z-axis, both in the plane of rotation, but also in other planes.

For simplicity, consider a spherical coordinate system centered at the intersection point of the plane of rotation (the horizontal plane) and the axis of rotation of the propeller. The azimuth angle determines the position of a blade during the revolution. The blade pitch is usually (for vibrations and balance of forces reasons) changed in a sinusoidal manner, such that the pitch of a blade is maximal at a certain azimuth angle and minimal at the directly opposite angle (+/−180 degrees away). The transitions between the maximal and minimal blade pitch are gradual throughout the revolution and follow a sine wave pattern.

In helicopters, this type of control is referred to as cyclic pitch control and may directly or indirectly be used for controlling the orientation (attitude) and/or position of the vehicle in space. By extension, as used herein, the term "cyclic pitch control" refers to changing the blade pitch of the blades of a propeller individually, depending on the azimuth position of the blade in a certain revolution, unrelated to whether or not this is a part of the propulsion system of a helicopter. Similarly, "sinusoidal cyclic pitch control" refers to systems where the blade pitch follows sinusoidal pattern.

Cyclic and collective pitch control can be combined, integrating the individual properties of both to achieve a more sophisticated control of the vector of thrust. For example, in case the cyclic pitch control is sinusoidal, the phase of the blade pitch sine wave defines the azimuth angle of the direction in which the axis of the average thrust is shifted from the axis of rotation. The amplitude of the sine wave defines how far is the axis of the average thrust shifted from the z-axis, which is also directly related to the magnitude of the torque vector (other than the torque around the z-axis). The average value of the sinusoid (offset from the zero blade pitch) defines the collective pitch component.

One notable problem in UAVs with a helicopter-style propulsion system, such as those discussed above, is the mechanical complexity of the swashplate and related mechanics, and the large distance required between the motor and the propeller to accommodate these components. The coaxial helicopter configuration, which recently gained a lot of popularity especially in UAV designs, further increases the spacing requirements and mechanical complexity of the traditional design involving a mechanical swashplate. These spacing requirements often limit the minimum height of the aircraft and render the configuration inappropriate for small to medium sized vehicles.

In view of the above, there is a need for a UAV "virtual swashplate" system, where the pitch of the propeller can be controlled by changing the relative position of the rotors of two motors/engines.

SUMMARY OF THE INVENTION

It is an object of the present invention to provide an unmanned aerial vehicle.

It is another object of the present invention to provide an unmanned aerial vehicle where the pitch of the propeller is controlled by changing the relative position of the rotors of the two motors of the vehicle.

It is another object of the present invention to provide an unmanned aerial vehicle having a compact construction.

These and other objects are achieved by the present invention.

In an embodiment, a propulsion system for a vehicle includes a first motor having a first rotor, a second motor having a second rotor, a propeller having at least one blade, the propeller being operatively connected to the first rotor of the first motor and rotationally driven by the first motor, and a pitch control device between the first rotor of the first motor and the second rotor of the second motor, the pitch control device being configured to translate a relative position of the first rotor with respect to second rotor into a blade pitch of the at least one blade of the propeller.

In another embodiment, a method for controlling propulsion of a vehicle includes actuating a first motor to rotate a first rotor of the first motor at a first angular velocity, to rotationally drive a propeller having at least one blade, actuating a second motor to rotate a second rotor of the second motor at a second angular velocity, and varying the second angular velocity of the second rotor with respect to the first angular velocity of the first rotor to adjust a blade pitch of the at least one blade of the propeller.

In yet another embodiment, an unmanned aerial vehicle includes a propulsion system having a first motor having a first rotor, a second motor having a second rotor, and a propeller having at least one blade, the propeller being operatively connected to the first rotor of the first motor and rotationally driven by the first motor, and a pitch control device configured to vary a blade pitch of the at least one blade in dependence upon a changed relative position of the second rotor with respect to the first rotor.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
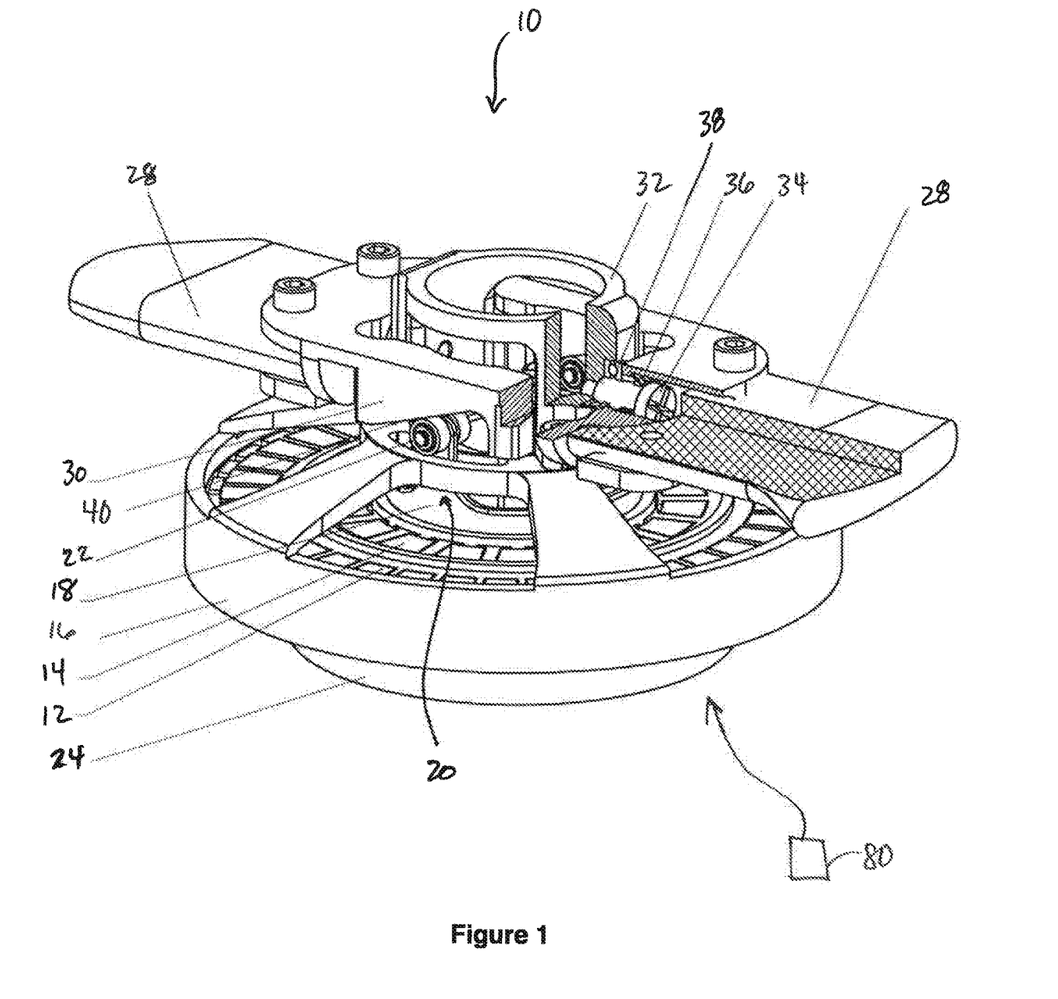
FIG. 1 is a perspective view of a propulsion system for an unmanned aerial vehicle, illustrating a hinged connection between the propeller and rotor assembly and wheel/slope mechanical linkage between the two rotors, shown with a normal position of the propeller.
Figure 2:
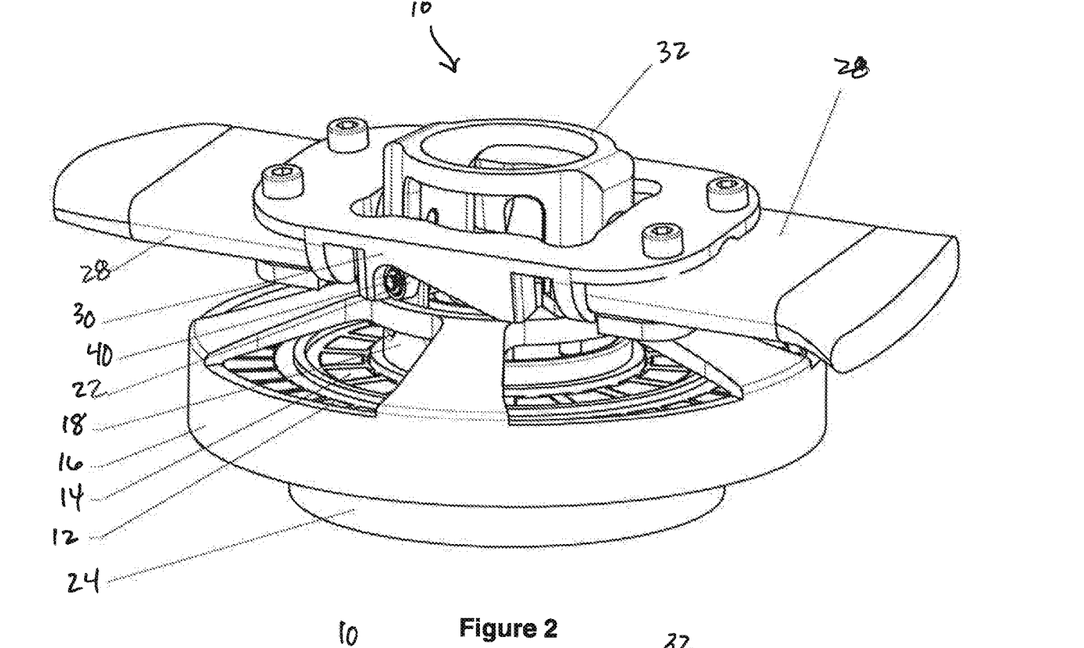
FIG. 2 is a perspective view of the propulsion system of FIG. 1, shown with a positive cyclic blade pitch applied to the first blade of the propeller and a negative cyclic blade pitch applied to the second blade of the propeller.
Figure 3:
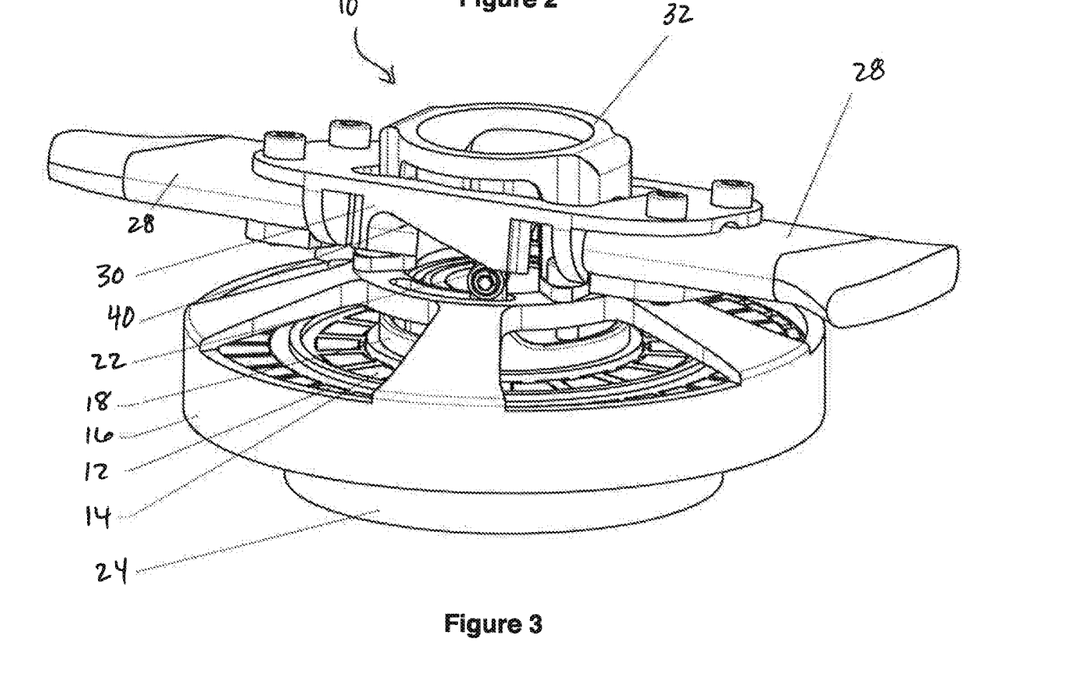
FIG. 3 is a perspective view of the propulsion system of FIG. 1, shown with a negative cyclic blade pitch applied to both the first blade of the propeller the second blade of the propeller.
Figure 4:
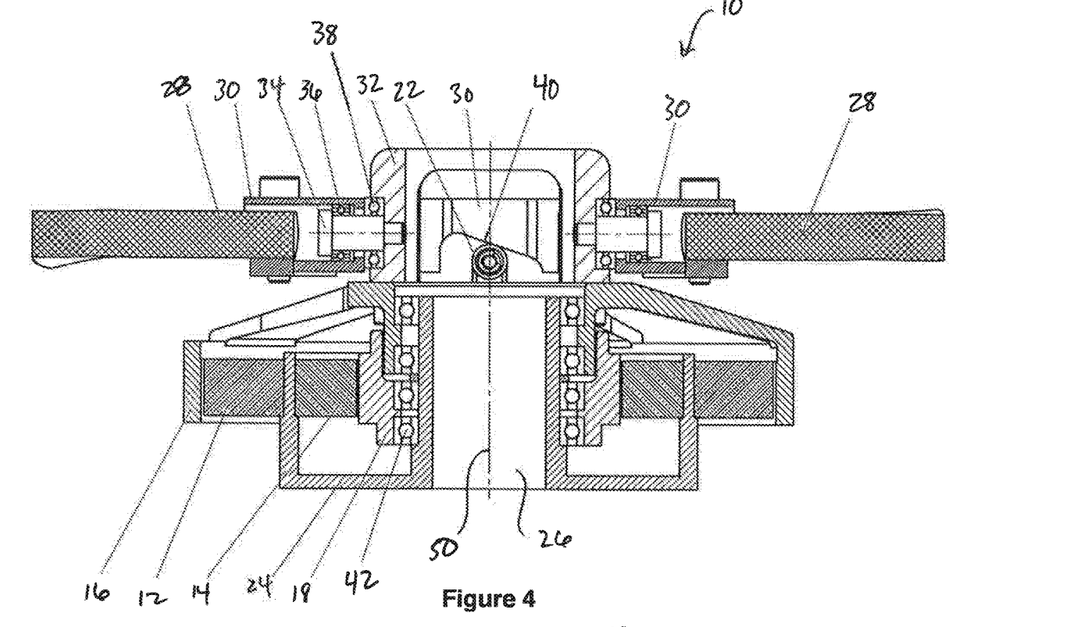
FIG. 4 is a longitudinal cross-sectional illustration of the propulsion system of FIG. 1.
Figure 5:
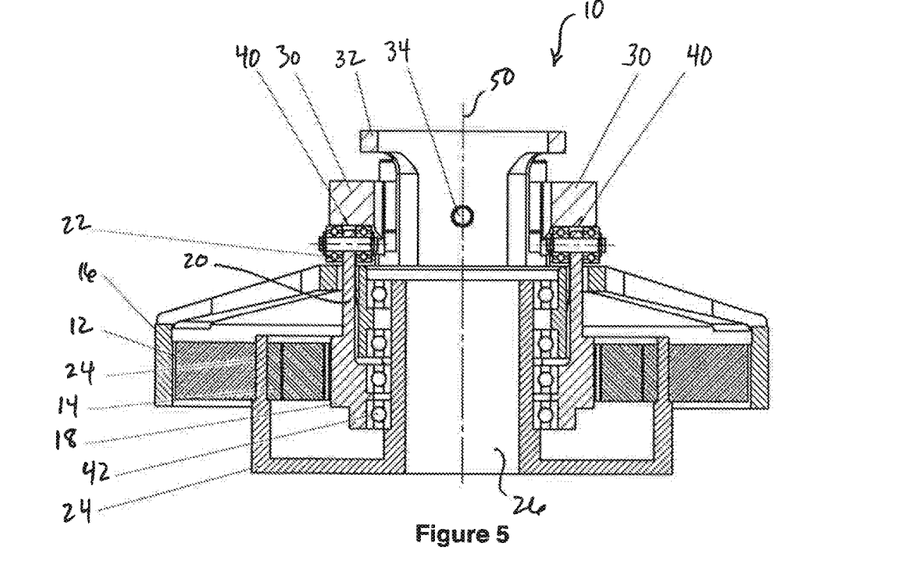
FIG. 5 is a lateral cross-sectional illustration of the propulsion system of FIG. 1.

With reference to FIGS. 1-5, a propulsion system 10 for an unmanned aerial vehicle ("UAV") with a cyclic blade pitch control system according to an embodiment of the present invention, is illustrated. The propulsion system 10 and/or the UAV on which the propulsion system 10 is integrated may generally take the form of a dual, coaxial rotor type UAV, and includes a first, main brushless direct current motor 12 and a second, auxiliary brushless direct current motor 14 mounted coaxially with the first motor 12. The first motor 12 is preferably an outrunner, having a stator/windings and a rotor 16 positioned around or externally to the stator. The second motor 14 is preferably an inrunner, having a stator/windings and a rotor 18 positioned inside the stator. The rotors 16, 18 each include the permanent magnets (not shown) of the respective motor. As best shown in FIGS. 1 and 5, the rotor 18 of the second, auxiliary motor 14 incudes a pair of arms 20 that extend upwardly and through openings in the rotor 16 of the main motor 12. These arms 20 hold radial ball bearings 22 at the distal ends thereof, the purpose of which will be discussed hereinafter. In an embodiment, a pair of radial ball bearings 22 are mounted to each end of the arms 20, for rotation about a horizontal axis.

As further illustrated in FIGS. 1-5, the UAV propulsion system 10 also includes a base structure 24 that holds the stators of both motors 12, 14 and affixes them to a common, non-rotating hollow shaft 26 of the UAV propulsion system 10. Main ball bearings 42 allow for rotation of the rotors 16, 18 of the main and auxiliary motors 12, 14, respectively with respect to the hollow shaft 26, about a central, vertical axis 50. A propeller 28 is affixed to a propeller holder module 30, as discussed hereinafter. The propeller holder module 30 provides for the hinged connection of the propeller 28 to an upper extension 32 of the rotor 16 of the main motor 12 via a propeller hinge bolt 34, radial ball bearings 36 and axial ball bearings 38. Importantly, this hinged construction allows the blade pitch of the propeller 28 to be selectively varied, as discussed in detail hereinafter.

As best shown in FIGS. 3 and 4, the propeller holder module 30 includes a generally downward-facing, inclined surface 40 that receives the radial ball bearings 22 that are mounted to the distal ends of the arms 20 of the rotor 18 of the auxiliary motor 14. The ball bearings 22 are thus configured to ride along the inclined surface 40 of the propeller holder module 30 upon changing the rotational position of the rotor 18 of the auxiliary motor 14, to vary the blade pitch of the propeller 28. In this respect, the blade pitch of the propeller 28 may be varied by changing the rotational position of the rotor 18 of the auxiliary motor 14.

In an embodiment, the propulsion system 10 includes a controller 80 for controlling operation of the main rotor 12 and auxiliary rotor 14. As discussed below, the controller is configured to continuously measure angular velocities of the first rotor and the second rotor and provide closed loop control of the angular velocity of at least one of the first motor and the second motor. Moreover, in an embodiment, the controller may be configured to continuously measure an angular position of the first rotor and an angular position of the second rotor, and to provide closed loop control of the relative angular position of the first rotor with respect to second rotor. The controller 80 may be on-board the UAV or otherwise integrated with the propulsion system. In other embodiments, it is possible that the controller 80 may be offboard the UAV but in communication with the UAV and propulsion system thereof for controlling the motors 12, 14.

Operation of the UAV propulsion system 10 will now be discussed in connection with FIGS. 1-5, with reference to a rising blade and falling blade of the propeller 28. As used herein, "rising blade" refers to the blade of the propeller 28 which increases its blade pitch upon the auxiliary motor 14 rotating with higher angular velocity than the main motor 12. Moreover, as both blades of the propeller 28 are mechanically fixed to one another via the propeller holder module 30, as the pitch of one blade increases the other blade will decrease its blade pitch, and as a consequence such blade is referred to herein as the "falling blade." (Note that the designation depends on the direction of rotation of the propeller (whether clockwise or counter-clockwise) and the design of the mechanical linkages). As will be readily appreciated, when the angular velocity of the rotor 18 of the auxiliary motor 14 is lower than the angular velocity of the rotor 16 of the main motor 12, the "rising blade" decreases its blade pitch and the "falling blade" increases its blade pitch. If/when the direction of rotation of the propeller changes—the rising blade becomes the falling blade and vice versa.

In operation, the rotor 16 of the main motor 12 rotates with the required angular velocity, transmitting the motor torque through the upper extension 32 of the rotor 16 of the main motor 12, the propeller holder module 30 and through the propeller hinge bolt 34 and radial ball bearings 36, to the propeller 28. The rotor 18 of the auxiliary motor 14 rotates with a cyclically increasing and decreasing angular velocity, such that the motor 14 rotates with maximal angular velocity upon the rising blade passing over the azimuth angle defining the direction in which the controller requires the axis of the average thrust to be moved from the z-axis 50. Consequently, the rotor 18 of the auxiliary motor 14 rotates with minimal angular velocity upon the falling blade passing over the azimuth angle defining the direction opposite (+/−180 degrees away) to the direction in which the controller requires the axis of the average thrust to be moved from the z-axis 50. The cyclically increasing and decreasing angular velocity of the auxiliary motor 14 are controlled in such a way so that the average angular velocity of the auxiliary motor 14 is the same as the angular velocity of the main motor 12.

During a subsection of a revolution, when the auxiliary motor 14 rotates with higher angular velocity than the main motor 12, the azimuth position of the auxiliary motor rotor 18 increases faster and leads relative to the azimuth position of the main motor rotor 16. This movement and related torque is transmitted via the arms 20 of the rotor 18 of the auxiliary motor 14, through the bearings 22 and inclined surface 40 to the propeller holder module 30, which changes its inclination, and as a result the blade pitch of the rising blade increases and simultaneously the blade pitch of the falling blade decreases.

Similarly, during a subsection of a revolution, when the auxiliary motor 14 rotates with lower angular velocity than the main motor 12, the azimuth position of the auxiliary motor rotor 18 decreases faster and lags relative to the azimuth position of the main motor rotor 16. This movement and related torque is transmitted via the arms 20 of the rotor 18 of the auxiliary motor 14, through the bearings 22 and inclined surface 40 to the propeller holder module 30, which changes its inclination, and as a result the blade pitch of the rising blade decreases and simultaneously the blade pitch of the falling blade increases.

Figure 6:
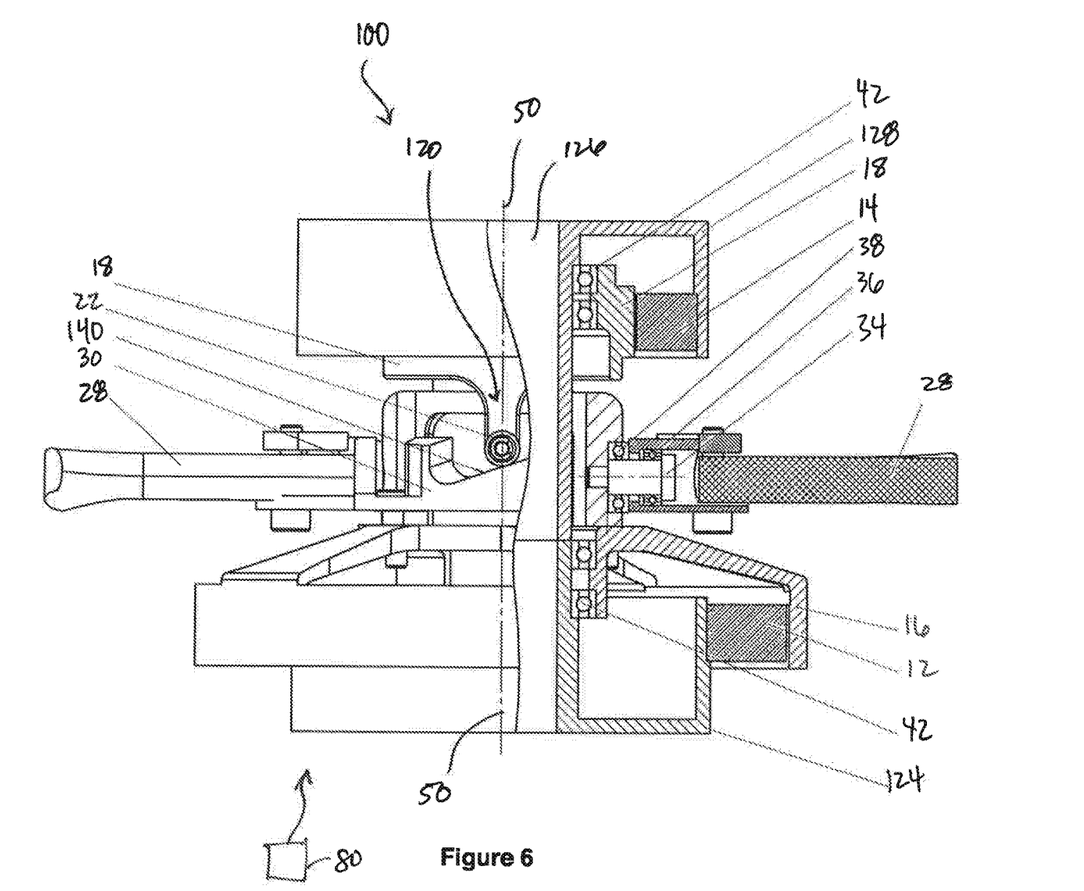
FIG. 6 is a partial cross-section, perspective view of a propulsion system for an unmanned aerial vehicle, according to another embodiment of the invention.

Referring now to FIG. 6, an unmanned aerial vehicle propulsion system 100 with a cyclic blade pitch control system according to another embodiment of the invention is illustrated. The UAV propulsion system 100 is generally similar to the UAV propulsion system 10 described above in connection with FIGS. 1-5, where like reference numerals designate like parts. As shown therein, rather than the auxiliary motor 14 being nested within the main motor 12, the auxiliary motor 14 is instead positioned above the propeller 28. As shown therein, however, rather than the propeller holder module 30 having a downwardly-facing including surface 40 (as shown in the embodiment of FIGS. 1-5, the propeller holder module 30 of propulsion system 100 features an inclined surface 140 that is generally upward-facing. Similar to the embodiment of FIGS. 1-5, the including surface 140 likewise receives the radial ball bearings 22 that are mounted to the distal ends of downwardly-extending arms 120 of the rotor 18 of the auxiliary motor 14. The ball bearings 22 are thus configured to ride along the inclined surface 140 of the propeller holder module 30 upon changing the rotational position of the rotor 18 of the auxiliary motor 14, to vary the blade pitch of the propeller 28, in a manner similar to that discussed above.

As also shown in FIG. 6, the base structure 124 of the propulsion system 100 is configured differently from the base structure 24 of the UAV propulsion system 10 described above, in order to accommodate the position of the auxiliary motor 14 above the propeller 28 and affix both motors 12, 14 to the non-rotating, hollow shaft 126 of the UAV propulsion system 100. In particular, base structure 24 additionally includes an upper portion 128 configured to accommodate the auxiliary motor 14.

Despite the location of the auxiliary motor 14 above the propeller 28, rather than nested within the main motor 12, and the inverse orientation of the inclined surface 140 (as compared to inclined surface 40 of the embodiment of FIGS. 1-5), operation of the UAV propulsion system 100 is substantially the same as that described above for the UAV propulsion system 10 of FIGS. 1-5.

Figure 7:
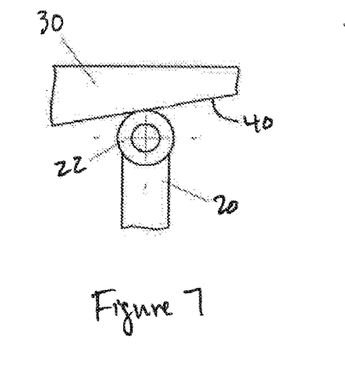
FIG. 7 is a schematic illustration of a mechanical linkage of a propulsion system for an unmanned aerial vehicle that is used to change the blade pitch of the propeller, according to an embodiment of the invention.
Figure 8:
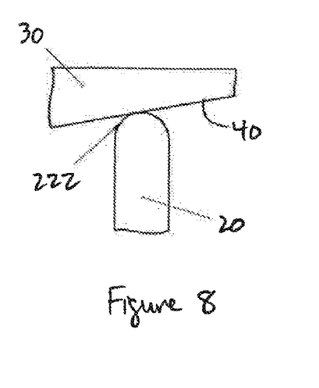
FIG. 8 is a schematic illustration of a mechanical linkage of a propulsion system for an unmanned aerial vehicle that is used to change the blade pitch of the propeller, according to another embodiment of the invention.
Figure 9:
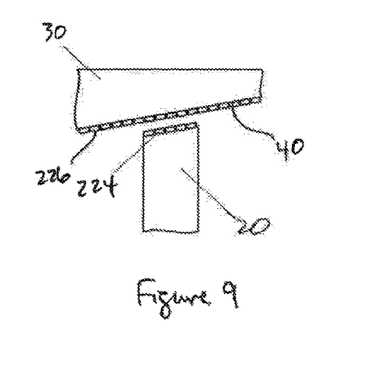
FIG. 9 is a schematic illustration of a mechanical linkage of a propulsion system for an unmanned aerial vehicle that is used to change the blade pitch of the propeller, according to another embodiment of the invention.

Turning now to FIGS. 7-9, various configurations of the mechanical linkage of a UAV propulsion system that is used to change the blade pitch of the propeller of the UAV propulsion system is shown. As shown in FIG. 7, a radial ball bearing 22 and inclined surface 40 on the propeller holder module 30 may be utilized, as discussed above in connection with FIGS. 1-6. Alternatively, as shown in FIG. 8, a mechanical sliding contact arrangement may be utilized. In particular, rather than holding ball bearings, the distal ends of the arms 20 of the rotor 18 of the auxiliary motor 14 may be formed with an arcuate or curved surface 222 that is configured to slide along the inclined surface 40/140 of the propeller holder module 30. In an embodiment, as shown in FIG. 9, a magnetic arrangement may instead be utilized. In particular, as shown therein, the distal ends of the arms 20 of the rotor 18 of the auxiliary motor may configured with a magnetic portion 224, and the inclined surface 40/140 may be likewise configured with a magnetic portion 226. The magnetic portions 224, 226 may be either repelling magnets or attracting magnets.

Figure 10:
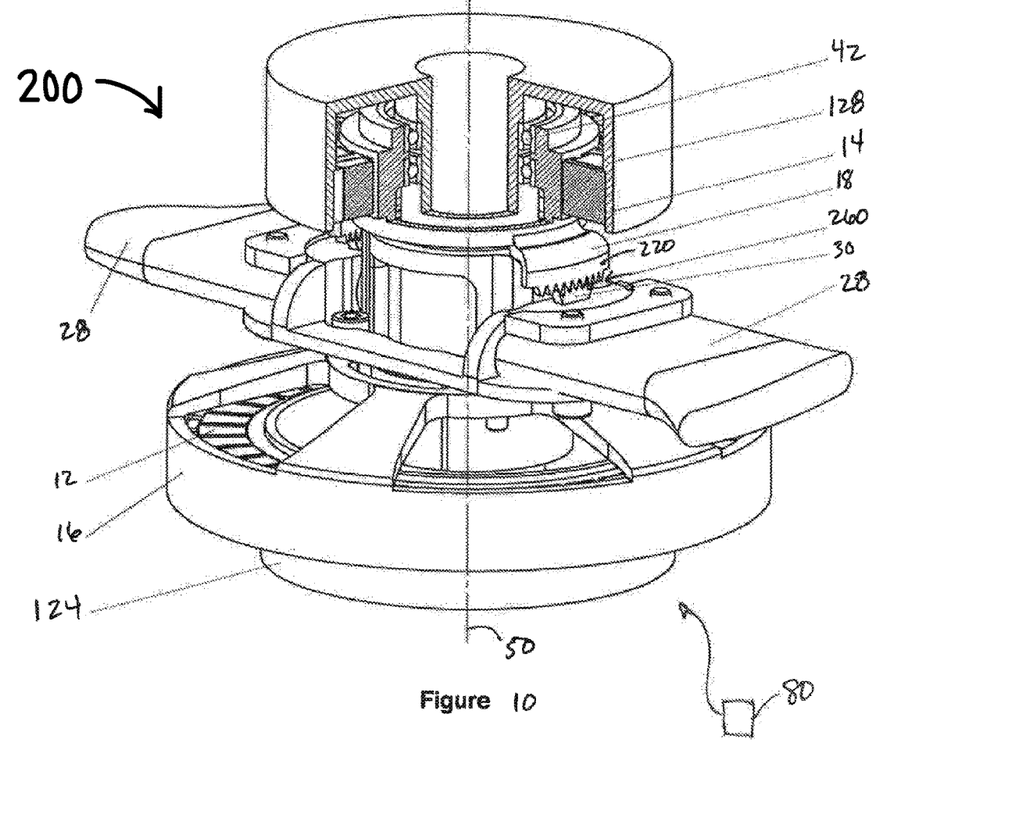
FIG. 10 is a perspective view of a propulsion system for an unmanned aerial vehicle, according to another embodiment of the invention.

Referring finally to FIG. 10, an unmanned aerial vehicle propulsion system 200 according to another embodiment of the invention is illustrated. As shown therein, the propulsion system includes a linkage that changes the blade pitch depending on the relative position of the main and auxiliary motors via a toothed wheel section. In particular, the UAV propulsion system 200 is generally similar to the UAV 100 described, where like reference numerals designate like parts, and where the auxiliary motor 14 is positioned above the propeller 28. As shown therein, however, the opposing, downwardly depending arms 220 of the rotor 18 of the auxiliary motor 14 are configured with toothed wheel subsections which form a toothed wheel coupled system 260 for changing the blade pitch of the propeller As described above, the present invention therefore provides a "virtual swashplate" system, where the pitch of the propeller is controlled by changing the relative position of the rotors of two motors (i.e., the main motor 12 and the auxiliary motor 12). The main motor 12 generates the main driving moment of the propeller 28 and the auxiliary motor 14 accelerates and decelerates to change the blade pitch of the propeller 28 via a set of mechanical (FIGS. 1-8, 10) or magneto-mechanical (FIG. 9) linkages.

In an embodiment, the angular velocity of the auxiliary motor 14 follows a sinusoidal wave pattern with an average angular velocity equal to the angular velocity of the main motor 12, and with a period of the sinusoidal wave equal to the time for one revolution of the rotor 16 of the main motor 12. In this manner, a virtual swashplate with a cyclic control can be implemented (with appropriate mechanical attachment of the propellers 28), that can control both the direction angle of the highest propeller pitch via the phase offset of the sine wave, and the magnitude/highest-to-lowest propeller pitch difference via the amplitude of the sine wave.

In another embodiment, the auxiliary motor 14 can follow an angular velocity with complex, periodic, non-sinusoidal trajectory with the purpose of (1) enhancing the control torque magnitude beyond the capabilities of the classical sinusoidal trajectory, which although can generate significant vibrations, can provide supplemental torque in loss of control situations; and (2) implementing complex control torque setpoint switching strategies.

In another embodiment, the angular velocity of the auxiliary motor 14 can be maintained constant and equal to the angular velocity of the main motor 12. By controlling the relative position of the rotor 16 of the main motor 12 and the auxiliary motor 14 (by intermittently accelerating or decelerating the shaft of the auxiliary motor 14) and with the appropriate mechanical attachment of the propellers, a collective blade pitch control system can be implemented which can increase and decrease the collective blade pitch as required.

Advantages of the present invention include fast dynamics, i.e., very fast blade pitch change (within one revolution the maximum blade pitch can be changed from one azimuth direction to the opposite with full magnitude), compact implementation, in that the mechanical attachment does not require large distance between the blade and the motor, and mechanical simplicity compared to a traditional swashplate.

In an embodiment both motors can be implemented as contained within one another, as shown in FIGS. 1-5 (where main motor 12 is an out-runner and the auxiliary motor 14 is an in-runner), and the motors can either share a magnetic core or have magnetic cores attached to one another.

In another embodiment, the auxiliary motor 14 can be substituted by an electromechanical or electromagnetic brake, which when engaged could cause the equivalent effect of slowing down the auxiliary motor. The control torque generation potency of such a system will be half of a system with an auxiliary motor and higher vibrations, however with lower implementation complexity.

In yet another embodiment both motors can be implemented as contained within one another, or one above or below the other, and both motors can be out-runners or in-runners without sharing any magnetic cores. In another embodiment both motors can generate the main driving moment of the propeller, where the propeller is connected via hinges directly to the two main rotors in a manner so change of the difference between the angular velocity of the two motors controls the blade pitch in a collective manner.

In another embodiment more than two motors can be used to control the propeller with more than 2 blades rotating in the same direction of rotation, providing that each controlling motor operates the pitch angle of one or more propeller blades and all blades are propelled by one or several main motors.

While the present invention has been described herein in connection with a completely rigid rotor head, the invention is not so limited in this regard and is equally applicable to fully articulated, teetering and rigid rotor heads. Moreover, while the present invention has been described in connection with aerial vehicles, the present invention may be used in connection with water vehicle and underwater vehicles as well. Still further, the present invention can also be employed with manned vehicles and is not limited to unmanned vehicles.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A propulsion system for a vehicle, comprising:
a first motor having a first rotor;
a second motor having a second rotor;
a propeller having at least one blade, the propeller being operatively connected to the first rotor of the first motor and rotationally driven by the first motor; and
a pitch control device between the first rotor of the first motor and the second rotor of the second motor, the pitch control device being configured to translate a relative position of the first rotor with respect to the second rotor into a blade pitch of the at least one blade of the propeller;
wherein the relative position of the first rotor with respect to the second rotor is variable by increasing or decreasing an angular velocity of one the first motor and the second motor with respect to the other of the first motor and the second motor;
wherein the propeller is hingedly connected to the first rotor to allow for the blade pitch of the at least one blade to be varied;
wherein the pitch control device includes a propeller holder module connected to the at least one blade and a linkage arm connected to the second rotor; and
wherein the propeller holder module has an angled engagement surface that interfaces with the linkage arm.

2. The propulsion system of claim 1, wherein:
the linkage arm is movable along the angled engagement surface as the relative position of the first rotor with respect to the second rotor is varied, to change the blade pitch of the at least one blade.

3. The propulsion system of claim 2, wherein:
a distal end of the linkage arm includes a ball bearing that contacts the angled engagement surface of the propeller holder module.

4. The propulsion system of claim 2, wherein:
a distal end of the linkage arm includes a curved surface that contacts the angled engagement surface of the propeller holder module.

5. The propulsion system of claim 2, wherein:
the engagement surface includes a first magnetic portion; and
a distal end of the linkage arm includes a second magnetic portion configured to interact with the first magnetic portion of the engagement surface.

6. The propulsion system of claim 5, wherein:
the first magnetic portion and the second magnetic portion are repelling magnets.

7. The propulsion system of claim 1, wherein:
the second motor is mounted coaxially with the first motor;
the first motor is an outrunner, wherein the first rotor is positioned externally to a stator of the first motor; and
the second motor is an inrunner, wherein the second rotor is positioned internal to a stator of the second motor.

8. The propulsion system of claim 1, wherein:
the second motor is one of an electromechanical brake or an electromagnetic brake.

9. The propulsion system of claim 1, further comprising:
a controller configured to continuously measure angular velocities of the first rotor and the second rotor and provide closed loop control of the angular velocity of at least one of the first motor and the second motor.

10. The propulsion system of claim 9, wherein:
the controller is configured to continuously measure an angular position of the first rotor and an angular position of the second rotor, and to provide closed loop control of the relative angular position of the first rotor with respect to second rotor.

11. The propulsion system of claim 1, wherein:
the propulsion system is integrated with one of a manned aerial vehicle, an unmanned aerial vehicle, a manned water vehicle, an unmanned water vehicle, a manned underwater vehicle, an unmanned underwater vehicle, a manned multi-medium/hybrid vehicle or an unmanned multi-medium/hybrid vehicle.

12. A method for controlling propulsion of a vehicle, comprising the step of:
actuating a first motor to rotate a first rotor of the first motor at a first angular velocity, to rotationally drive a propeller having at least one blade;
actuating a second motor to rotate a second rotor of the second motor at a second angular velocity; and
varying the second angular velocity of the second rotor with respect to the first angular velocity of the first rotor to adjust a blade pitch of the at least one blade of the propeller;
wherein the vehicle includes a pitch control device between the first rotor of the first motor and the second rotor of the second motor, the pitch control device being configured to translate a relative position of the first rotor with respect to the second rotor into the blade pitch of the at least one blade of the propeller;
wherein the pitch control device includes a propeller holder module connected to the at least one blade and a linkage arm connected to the second rotor; and
wherein the propeller holder module has an angled engagement surface along which the linkage arm is moveable as the relative position of the first rotor with respect to the second rotor is varied, to change the blade pitch of the at least one blade.

13. The method according to claim 12, wherein:
varying the second angular velocity of the second rotor includes:
accelerating the second rotor to increase the second angular velocity of the second rotor with respect to the first angular velocity of the first rotor to increase the blade pitch of the at least one blade; and
decelerating the second rotor to decrease the second angular velocity of the second rotor with respect to the first angular velocity of the first rotor to decrease the blade pitch of the at least one blade.

14. The method according to claim 12, further comprising the steps of:
measuring the first angular velocity of the first rotor and the second angular velocity of the second rotor and;
providing closed loop control of the first angular velocity of the first rotor and/or the second angular velocity of the second rotor.

15. The method according to claim 12, further comprising the steps of:
measuring an angular position of the first rotor and an angular position of the second rotor; and
providing closed loop control of the relative angular position of the first rotor with respect to second rotor.

16. An unmanned aerial vehicle, comprising:
a propulsion system having a first motor having a first rotor, a second motor having a second rotor, and a propeller having at least one blade, the propeller being operatively connected to the first rotor of the first motor and rotationally driven by the first motor; and
a pitch control device configured to vary a blade pitch of the at least one blade in dependence upon a changed relative position of the second rotor with respect to the first rotor;
wherein the pitch control device includes a propeller holder module connected to the at least one blade and a linkage arm connected to the second rotor; and
wherein the propeller holder module has an angled engagement surface that interfaces with the linkage arm.

* * * * *